July 19, 1960 L. W. FROST ET AL 2,945,829
HIGH TEMPERATURE ALKYD RESIN VARNISH
Filed Aug. 5, 1958
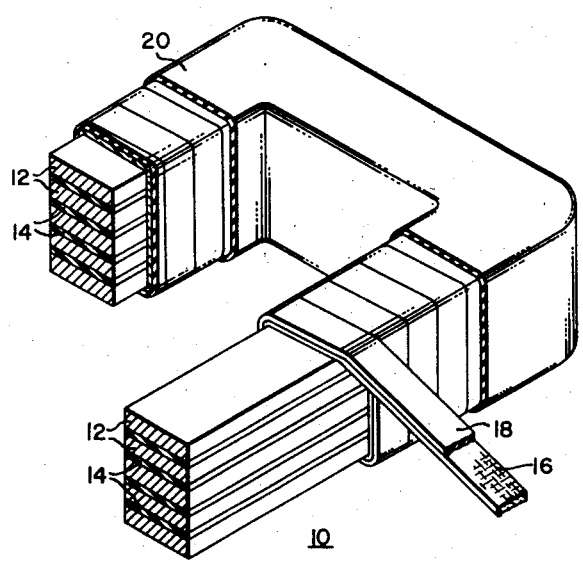
WITNESSES
Edwin C. Bassler
Charles L. Menzemer
INVENTORS
Lawrence W. Frost &
Morris A. Mendelsohn
BY
William G. Addiss
ATTORNEY United States Patent Office 2,945,829
Patented July 19, 1960

2,945,829
HIGH TEMPERATURE ALKYD RESIN VARNISH

Lawrence W. Frost, Murrysville, and Morris A. Mendelsohn, Penn Township, Allegheny County, Pa., assignors to Westinghouse Electric Corporation, East Pittsburgh, Pa., a corporation of Pennsylvania Filed Aug. 5, 1958, Ser. No. 753,184

9 Claims. (Cl. 260—21)

This invention relates to alkyd resins and varnishes, and more particularly to isophthalate alkyd resins and varnishes suitable for use as electrical insulation on apparatus operating at elevated temperatures.

Isophthalate polyesters derived from glycerol, glycols, trimethylolethane, and the like have unusually high thermal stability. The unmodified resins are useful for many purposes. However, it has been difficult to formulate varnishes using these resins. Certain varnishes made from these resins have poor through-cure. Others lack desired flexibility characteristics and are curable only at high temperatures. Still other varnishes have poor moisture resistance and are not soluable in hydrocarbon solvents. Heretofore, attempts have been made to overcome these difficulties. However, the attempts generally have resulted in improvement in only one or two of the properties, at the expense of the others.

The surprising discovery has now been made that by reacting specific compounds in predetermined ratios, an isophthalate alkyd varnish is obtained which has good through-cure characteristics, satisfactory thermal stability and flexibility properties, a reasonable curing temperature, as well as excellent moisture resistance.

An object of this invention is to provide a resinous composition having good through-cure, thermal stability, flexibility, a reasonable curing temperature, and good moisture resistance comprised of (A) from 98% to 90% by weight of the reaction product of critical amounts of (a) glycerol, (b) salicylic acid, (c) isophthalic acid and (d) dehydrated castor oil, and (B) from 2% to 10% by weight of at least one compound selected from the group consisting of (a) butylated melamine-formaldehyde resin, (b) butylated urea-formaldehyde resin, and (c) pyromellitic dianhydride.

Another object of the present invention is to provide a resinous varnish comprised of the resinous composition described above and a suitable hydrocarbon solvent.

Another object of this invention is to provide an electrical member comprising an electrical conductor having electrical insulation disposed thereon, said insulation comprising the heat-hardened reaction product of the varnish described above.

Other objects of this invention will, in part, be obvious, and will, in part, appear hereinafter.

For a better understanding of the nature and objects of this invention, reference should be had to the following detailed description and drawing, the single figure of which is a perspective view, partly in cross section, of an electrical coil insulated with the varnish of this invention.

Broadly, in accordance with the present invention and attainment of the foregoing objects there is provided a resinous composition of matter comprised of (A) from 98% to 90% by weight of the product of (a) from 5 mols to 8 mols glycerol, (b) from 2 mols to 5 mols salicylic acid, (c) from 4 mols to 6 mols isophthalic acid and (d) from .7 mol to 1.3 mols dehydrated castor oil, and (B) from 2% to 10% by weight of at least one compound selected from the group consisting of (a) butylated melamine-formaldehyde resin, (b) butylated urea-formaldehyde resin and (c) pyromellitic dianhydride. Sufficient alcohol should be employed to provide about a 30% to 50% stoichiometric excess of hydroxyl groups to carboxyl groups in the finished resin.

More specifically, in preparing the resin of this invention 24 to 44 lbs. dehydrated castor oil having a molecular weight of 870, 8.5 to 13.6 lbs. glycerol and approximately 0.035 pound calcium hydroxide are charged into a suitable reaction vessel and heated at a temperature of approximately 240° C. for about 1.5 hours while undergoing nitrogen sparging and agitation.

From 9.8 to 15.6 lbs. glycerol, from 10.7 to 26.8 lbs. salicylic acid, from 25.8 to 38.6 lbs. isophthalic acid, approximately 0.5 pound isopropyl titanate and sufficient xylene to give the desired kettle temperature and reflux rate are then added to the reaction nature. The mixture is cooked azeotropically, using a continuous decanting device to separate the water produced and to return refluxing xylene to the kettle. The reaction is carried out for approximately 4.5 hours at a temperature in the range of 200-235° C. with nitrogen sparging and rapid agitation. After termination of the reaction period, the product is allowed to cool to approximately 100° C. and a solution comprised of a suitable hydrocarbon for example, toluene, xylene, benzene and mixtures thereof and at least one compound selected from the group consisting of butylated melamine-formaldehyde resin, butylated urea-formaldehyde resin, pyromellitic dianhydride, or mixtures thereof are admixed with the reaction product. This addition solution is formulated so that the quantity of butylated melamine-formaldehyde resin, butylated urea-formaldehyde resin, pyromellitic dianhydride, or mixtures thereof constitute from 60% to 70% by weight of the solution and imparts from 2% to 10% by weight of the solids present in the final admixture product.

The resin thus prepared was cut to approximately 50% solids by the addition of a suitable hydrocarbon solvent, for example, xylene, to form a resin varnish.

The butylated melamine-formaldehyde resin and butylated urea-formaldehyde resin suitable for use in accordance with this invention were prepared according to the teachings of U.S. Patent 2,473,463 to Adams.

The pyromellitic dianhydride which may be used in accordance with the teaching of this invention is well known in the art and a discussion of its synthesis is not necessary in this application.

The following examples are illustrative of the practice of this invention:

Example I

A mixture of 34.2 pounds of dehydrated castor oil, 10.7 pounds of glycerol, and 0.035 pound of calcium hydroxide were charged into a suitable vessel and heated for 1.5 hours at 240° C. while undergoing nitrogen sparging and agitation. 12.3 pounds glycerol, 21.4 pounds of salicylic acid, 32.2 pounds of isophthalic acid, 0.5 pound of isopropyl titanate, and from 10 to 30 pounds of xylene was added to the reaction vessel and the mixture cooked azeotropically, using a continuous decanting device to separate the water produced and to return refluxing xylene to the kettle, for about 4.5 hours at a temperature in the range of 200–235° C. with nitrogen sparging and rapid agitation. At the conclusion of the reaction period, the reaction product was allowed to cool to approximately 100° C. and 7.7 pounds of a 65% solution of butylated melamine-formaldehyde resin in xylene was added and admixed with the reaction product.

Example II

The alkyd resin of Example I was admixed with a sufficient quantity of xylene to form a solution comprised of about 50% by weight of the alkyd resin of Example I. The varnish thus produced contained 48.8% solids, by weight, had a specific gravity of 0.998, a viscosity of 228 seconds Demmler #1, a drying time of 5 minutes at 135° C. and a gel time of 25 minutes at 135° C.

Example III demonstrates the through-cure property of the varnish of this invention.

*Example III*

A glass vial 21 mm. in diameter and 93 mm. high was filled to a depth of about 65 mm. with the varnish of Example II. A solid glass ball 13 mm. in diameter was dropped into the vial and it passed through the varnish to the bottom of the vial.

The varnish filled vial was heated at 150° C. for 2 hours to drive off the solvent. It was then placed in an oven and heated at a temperature of 200° C. After 45 minutes the vial was removed from the oven and inverted. The ball would not move through the thoroughly cured varnish.

Example IV demonstrates the flexibility of the varnish of this invention.

*Example IV*

Glass cloth having a thickness of 0.005 inch was dipped into the varnish of Example II. The coated cloth was baked for 2 hours at 150° C., dipped again, and baked for 16 hours at 150° C. The coating on the cloth had a thickness of 0.003 inch. The varnish coated cloth was wrapped about a ⅛ inch mandrel and then creased. The varnish coating did not crack.

Example V demonstrates the moisture resistance of the varnish of this invention.

*Example V*

A glass cloth was coated by the procedure described in Example IV. The glass cloth with a cured varnish film disposed thereon had a thickness of 0.0071 inch. The coated cloth was aged for 800 hours in a humidity cabinet at 150° F. and 99% relative humidity without any damaging effect.

The attached drawing illustrates an electrical coil 10. Coil 10 is comprised of electrical conductors 12 with insulation 14 disposed between said conductors 12. A glass cloth tape 16, coated with a varnish composition of the invention 18, is disposed about the circumference of coil 10. An additional insulating coating 20, comprised of a varnish within the teaching of this invention, may be applied over the tape 16.

Since certain changes in carrying out the above process as in the product embodying the invention may be made without departing from its scope, it is intended that the accompanying description and drawing be interpreted as illustrative and not limiting.

We claim as our invention:

1. A composition of matter comprised of (A) from 98% to 90% by weight of the reaction product of (a) from 5 mols to 8 mols gylcerol, (b) from 2 mols to 5 mols salicylic acid, (c) from 4 mols to 6 mols isophthalic acid and (d) from .7 mol to 1.3 mols dehydrated castor oil, there being sufficient alcohol present to provide about a 30% to 50% stoichiometric excess of hydroxyl groups to carboxyl groups and (B) from 2% to 10% by weight of at least one compound selected from the group consisting of (a) butylated melamine-formaldehyde resin, (b) butylated urea-formaldehyde resin and (c) pyromellitic dianhydride.

2. A composition of matter comprised of (A) from 98% to 90% by weight of the reaction product of (a) 6 mols of glycerol, (b) 4 mols of salicylic acid, (c) 5 mols of isophthalic acid and (d) 1 mol of dehydrated castor oil, and (B) from 2% to 10% by weight of a butylated melamine-formaldehyde resin.

3. A composition of matter comprised of (A) 95% by weight of the reaction product of (a) 6 mols of glycerol, (b) 4 mols of salicyclic acid, (c) 5 mols of isophthalic acid and (d) 1 mol of dehydrated castor oil, and (B) 5% by weight of a butylated melamine-formaldehyde resin.

4. A resinous varnish composition comprising (A) from 98% to 90% by weight of the reaction product of (a) from 5 mols to 8 mols gylcerol, (b) from 2 mols to 5 mols salicylic acid, (c) from 4 mols to 6 mols isophthalic acid and (d) from .7 mol to 1.3 mols dehydrated castor oil, there being sufficient alcohol present to provide about a 30% to 50% stoichiometric excess of hydroxyl groups to carboxyl groups, and (B) from 2% to 10% by weight of at least one compound selected from the group consisting of (a) butylated melamine-formaldehyde resin, (b) butylated urea-formaldehyde resin and (c) pyromellitic dianhydride, and (C) a suitable hydrocarbon solvent.

5. A resinous composition comprising (A) from 98% to 90% by weight of the reaction product of (a) 6 mols of glycerol, (b) 4 mols of salicylic acid, (c) 5 mols of isophthalic acid and (d) 1 mol of dehydrated castor oil, and (B) from 2% to 10% by weight of a butylated melamine-formaldehyde resin, and (C) a suitable hydrocarbon solvent.

6. A resinous varnish composition comprising (A) 95% by weight of the reaction product of (a) 6 mols of glycerol, (b) 4 mols of salicylic acid, (c) 5 mols of isophthalic acid and (d) 1.0 mol of dehydrated castor oil, and (B) 5% by weight of a butylated melamine-formaldehyde resin, and (C) a suitable hydrocarbon solvent.

7. An electrical member comprising an electrical conductor having electrical insulation disposed thereon, said insulation comprising the heat hardened reaction product of (A) from 98% to 90% by weight of the reaction product of (a) from 5 mols to 8 mols glycerol, (b) from 2 mols to 5 mols salicylic acid, (c) from 4 mols to 6 mols isophthalic acid and (d) from .7 mol to 1.3 mols dehydrated castor oil, there being sufficient alcohol present to provide about a 30% to 50% stoichiometric excess of hydroxyl groups to carboxyl groups, and (B) from 2% to 10% by weight of at least one compound selected from the group consisting of (a) butylated melamine-formaldehyde resin, (b) butylated urea-formaldehyde resin, and (c) pyromellitic dianhydride.

8. An electrical member comprising an electrical conductor having electrical insulation disposed thereon, said insulation comprising the heat hardened reaction product of (A) from 98% to 90% by weight of the reaction product of (a) 6 mols of glycerol, (b) 4 mols of salicylic acid, (c) 5 mols of isophthalic acid and (d) 1 mol of dehydrated castor oil, and (B) from 2% to 10% by weight of a butylated melamine-formaldehyde resin.

9. An electrical member comprising an electrical conductor having electrical insulation disposed thereon, said insulation comprising the heat hardened reaction product of (A) 95% by weight of the reaction product of (a) 6 mols of glycerol, (b) 4 mols of salicylic acid, (c) 5 mols if isophthalic acid and (d) 1 mol of dehydrated castor oil, and (B) 5% by weight of a butylated melamine-formaldehyde resin.

References Cited in the file of this patent

UNITED STATES PATENTS

| | | |
|---|---|---|
| 2,218,474 | Moore | Oct. 15, 1940 |
| 2,374,598 | Gray | Apr. 24, 1945 |
| 2,686,739 | Kohl | Aug. 17, 1954 |